(12) United States Patent
Kashihara et al.

(10) Patent No.: US 6,236,557 B1
(45) Date of Patent: May 22, 2001

(54) CAPACITOR FOR CAR AC GENERATOR

(75) Inventors: Toshiaki Kashihara; Yoshihito Asao, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,160

(22) Filed: Jul. 16, 1999

(30) Foreign Application Priority Data

Jan. 18, 1999 (JP) .................................................. 11-009194

(51) Int. Cl.$^7$ ....................................................... H01G 4/00
(52) U.S. Cl. ...................................... 361/301.3; 361/306.1
(58) Field of Search ............................... 361/301.3, 306.1, 361/308.1, 517–519, 535–538

(56) References Cited

U.S. PATENT DOCUMENTS

| 5,412,532 | * | 5/1995 | Nishimori et al. | ................ | 361/306.1 |
| 5,550,415 | | 8/1996 | Adachi et al. | ..................... | 310/68 R |

FOREIGN PATENT DOCUMENTS

| 6-87646 | 11/1994 | (JP) . |
| 7-213034 | 8/1995 | (JP) . |

* cited by examiner

*Primary Examiner*—Anthony Dinkins
(74) *Attorney, Agent, or Firm*—Sughrue, Mion, Zinn, Macpeak & Seas, PLLC (57) ABSTRACT

A capacitor for a car AC generator which improves assembly work efficiency and reduces a vibration load on the connection portions of the element terminals of the capacitor element and the terminals of the resin part, wherein a resin part installed in the inside space of a generator case has a one-end open bottomed cylinder-like container portion and resin side terminals around the opening portion of the container portion, a capacitor element for absorbing a surge generated by the voltage control of a voltage regulator is inserted into the inside of the container portion, the element side terminals of the capacitor element are connected to the respective resin side terminals on an insertion side, and the capacitor element is supported in the container portion by a solidified resin which is charged into a gap between the container portion and the capacitor element.

5 Claims, 6 Drawing Sheets

CAPACITOR FOR CAR AC GENERATOR

BACKGROUND OF THE INVENTION

1. Field of the Invention

The present invention relates to a capacitor for a car AC generator, which comprises a capacitor element in the inside space of a generator case.

2. Description of the Prior Art

Figure 9:
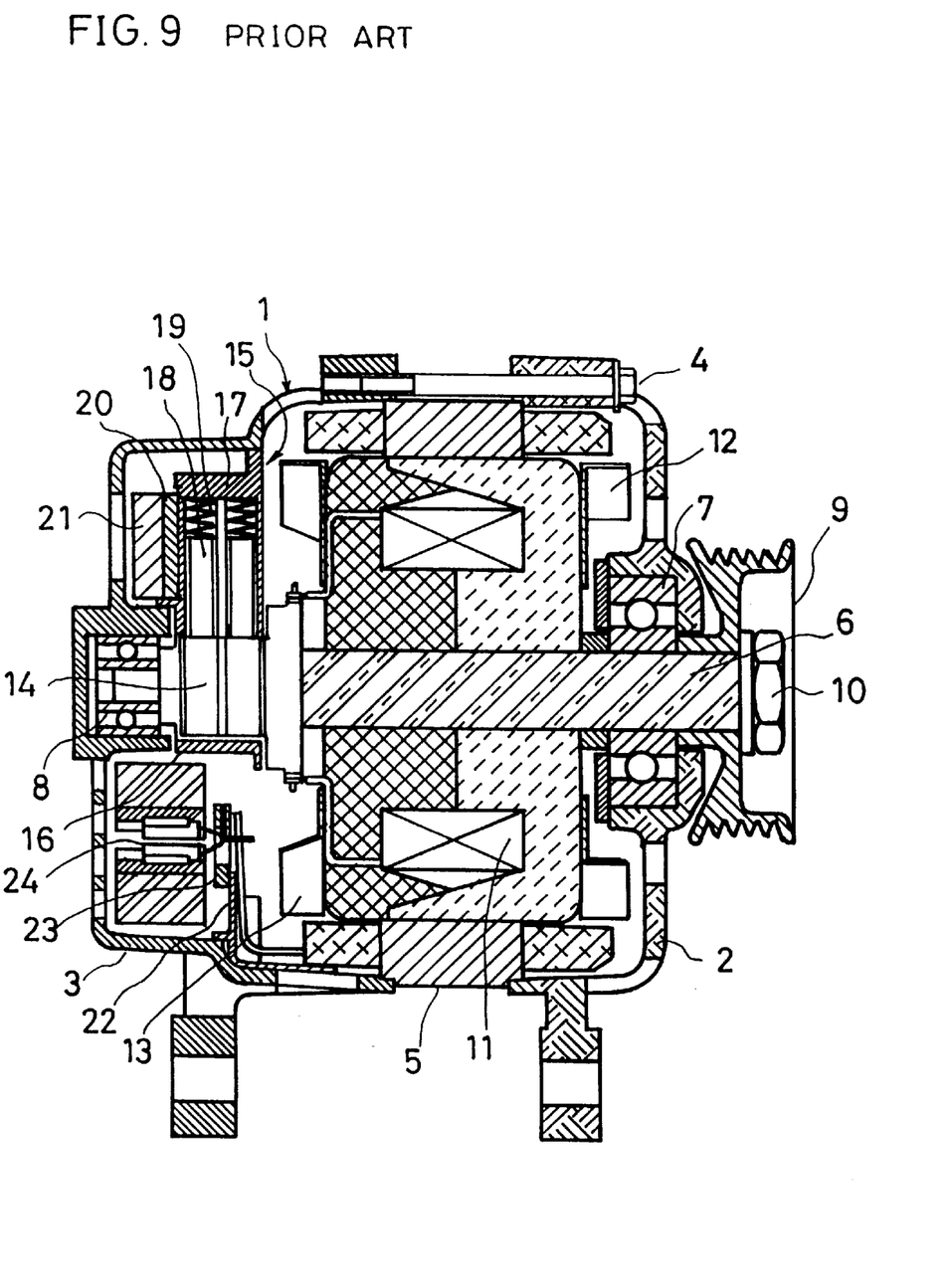
FIG. 9 is a sectional view of a car AC generator of the prior art.
Figure 10:
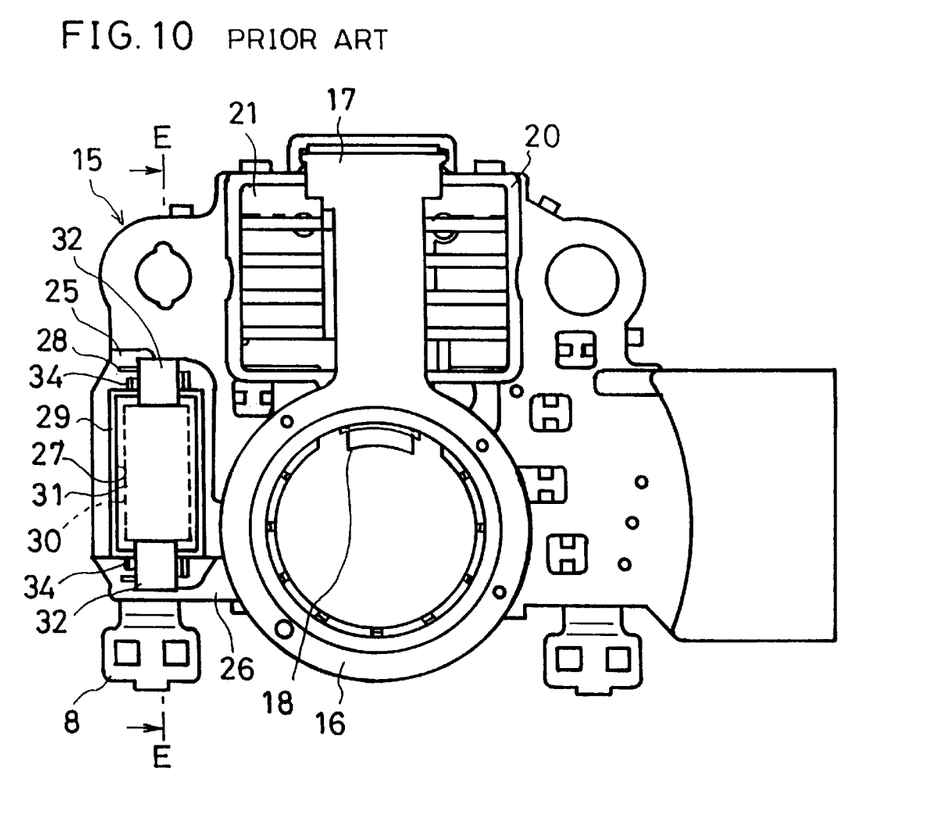
FIG. 10 is a front view of a capacitor of the prior art.
Figure 11:
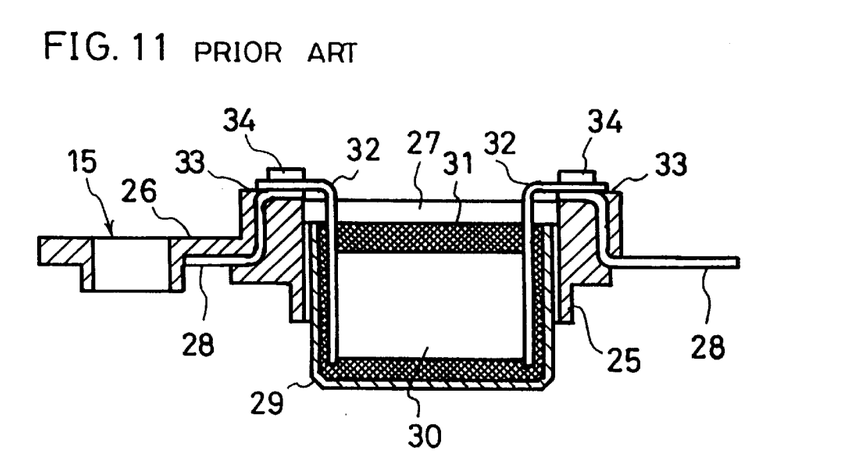
FIG. 11 is a sectional view cut on line E—E of FIG. 10.

FIG. 9 is a sectional view of a car AC generator disclosed by Japanese Patent Publication No. 6-87646, FIG. 10 is a front view of a capacitor disclosed by Japanese Laid-open Patent Application No. 7-213034, and FIG. 11 is a sectional view cut on line E—E of FIG. 10. In FIG. 9, reference numeral 1 denotes a generator case whose inside space is formed by fastening an aluminum front bracket 2 to an aluminum rear bracket 3 by a through bolt 4 in such a manner that they face each other. Denoted by 5 is a cylindrical stator composed of a core and a coil and supported by the inner wall of the front bracket 2 and the inner wall of the rear bracket 3 in the inside space of the generator case 1, 6 a generator shaft which is installed in a center portion of the front bracket 2 and a center portion of the rear bracket 3 through a front bearing 7 and a rear bearing 8 so that it can turn, 9 a pulley which is fastened to the generator shaft 6 projecting forward from the front bracket 2 by a nut 10 so that it can turn together with the generator shaft 6, 11 a cylindrical rotor which consists of a pair of a magnetic pole and a field core and is fitted onto the generator shaft 6 in the inside of the stator 5 so that it can turn together with the generator shaft 6, 12 a front fan which is fixed to the front side of the magnetic pole of the rotor 11, 13 a rear fan which is fixed to the rear side of the magnetic pole of the rotor 11, 14 a plurality of slip rings which are spaced apart from one another in a direction parallel to the axial direction of the generator shaft 6 and are fixed to the generator shaft 6 between the rotor 11 and the rear bearing 8 by an unshown insulating member so that they can turn together with the generator shaft 6, 15 a first resin part made from a synthetic resin and installed in the rear bracket 3, 16 a cylindrical slinger portion made from a synthetic resin and provided at the center of the first resin part 15 to surround the slip rings 14, 17 a brush holder portion made from a synthetic resin and provided in the first resin part 15 outside the slinger portion 16, 18 a plurality of brushes corresponding to the number of slip rings 14, which are inserted into the brush holder portion 17 and whose end portions projecting into the inside of the slinger portion 16 from the brush holder portion 17 are each contacted to the slip rings 14, 19 a plurality of brush springs for pressing the plurality of brushes 18 against the slip rings 14 elastically, and 20 a voltage control function portion made from a synthetic resin and provided in the first resin part 15 at the rear of the brush holder 17, to which a voltage regulator 21 is attached. Numeral 22 denotes a second resin part made from a synthetic resin and installed in the rear bracket 3 in such a manner that it does not interfere the first resin part 15, and 23 a rectifying function portion made from a synthetic resin and provided in the second resin part 22, to which a rectifier 24 comprising unidirectional conductive elements such as a diode is attached.

A description is subsequently given of the operation of the above car AC generator of the prior art when it is mounted on an automobile. The car AC generator is installed outside the cylinder block of an engine and a ring-shaped belt is stretched between a pulley provided on the crank shaft of the engine and the pulley 9 of the car AC generator. When a driver turns on the ignition switch of the automobile in this state, a current runs from the battery of the automobile to an ignition coil to start the engine and an excitation current runs into the brushes 18, the slip rings 14 and the field coil of the rotor 11 from the battery through the voltage regulator 21. When the generator shaft 6 turns by the start of the engine and then the rotor 11 turns in this state, three-phase AC induction electromotive force is generated in the coil of the stator 5, rectified by the rectifier 24 and charged into the battery. The front fan 12 and the rear fan 13 turn by the rotation of the rotor 11 so that air in the engine room of the automobile is sucked into the inside space of the generator case 1 through suction holes in the front bracket 2 and suction holes in the rear bracket 3. The intake air cools such parts as the stator 5, the rotor 11, the voltage regulator 21 and the rectifier 21 in the inside space of the generator case 1 and is then discharged into the engine room from exhaust holes in the front bracket 2 and exhaust holes in the rear bracket 3.

In FIG. 10, the first resin part 15 of the capacitor has a capacitor mounting portion 25 made from a synthetic resin on one side of the slinger portion 16 in addition to the slinger portion 16, the brush holder portion 17 and the voltage control function portion 20. The capacitor mounting portion 25 has a hole 27 extending through a plate-like base portion 26 projecting sideways from the slinger portion 16 and the brush holder portion 17 and two resin side terminals 28 provided in the base portion 26 around the hole 27 in such a manner that they face each other. A capacitor container 29 is installed in the capacitor mounting portion 25. As shown in FIG. 11, the capacitor container 29 contains a capacitor element 30 which is supported in the capacitor container 29 by a filling resin 31 such as an epoxy resin which is injected into a gap between the capacitor container 29 and the capacitor element 30 and solidified. The capacitor container 29 is inserted into the hole 27, and two element side terminals 32 projecting outward from the capacitor container 29 are connected to the respective resin side terminal 28 by solder 33. Therefore, the direction of injecting the filling resin 31 into the capacitor container 29 and the direction of connecting the element side terminals 32 to the respective resin side terminals 28 by the solder 33 are the same on the front side of the first resin part 15, thereby improving assembly work efficiency. The capacitor element 30 is interposed between the positive pole and the negative pole of the generator so that it is connected to these electrodes in parallel and absorbs a surge generated by the voltage control of the voltage regulator 21, thereby preventing the propagation of noise to car electric load devices such as an audio device and a blower fan.

Since the capacitor for a car AC generator of the prior art is constituted as described above, the capacitor container 29 separate from the first resin part 15 is inserted into the hole 27 of the first resin part 15 while the capacitor element 30 is fixed in the capacitor container 29 by the filling resin 31, and the connection portions of the resin side terminals 28 and the element side terminals 32 bear the weight of the capacitor container 29, the weight of the capacitor element 30 and the weight of the filling resin 31. When the car AC generator is connected to the engine of the automobile, the engine of the automobile is driven, and vibration is transmitted from the engine to the car AC generator, the weight of the capacitor container 29, the weight of the capacitor element 30 and the weight of the filling resin 31 serve as a vibration load on the connection portions of the resin side terminals 28 and the element side terminals 32 by the vibration repeatedly. Therefore, there is a possibility that these terminals are separated from each other. To cope with this, after the resin side terminals 28 are connected to the respective element side terminals 32 by the solder 33, end portions of the resin side terminals 28 projecting from the element side terminals 32 are bent inward so that bent portions 32 prevent separation between the resin side terminals 28 and the element side terminals 32. However, this requires the formation of the bent portions 34 and makes the structure complex.

SUMMARY OF THE INVENTION

In view of this, it is an object of the present invention to provide a capacitor for a car AC generator which can reduce a vibration load on the connection portions of the terminals of a capacitor element and the terminals of a resin part.

According to a first aspect of the present invention, there is provided a capacitor for a car AC generator in which a resin part installed in the inside space of a generator case has a one-end open bottomed cylinder-like container portion and resin side terminals around the opening portion of the container portion, a capacitor element for absorbing a surge generated by the voltage control of a voltage regulator is inserted into the inside of the container portion, the element side terminals of the capacitor element are connected to the respective resin side terminals on an insertion side, and the capacitor element is supported in the container portion by a solidified resin which is charged into a gap between the container portion and the capacitor element.

According to a second aspect of the present invention, there is provided a capacitor for a car AC generator in which the capacitor element, the element side terminals and the resin side terminals are covered by the solidified filling resin.

According to a third aspect of the present invention, there is provided a capacitor for a car AC generator in which the resin part has a barrier surrounding the opening portion of the container portion and the resin side terminals.

According to a fourth aspect of the present invention, there is provided a capacitor for a car AC generator in which the resin side terminals are connected to the respective element side terminals by welding.

According to a fifth aspect of the present invention, there is provided a capacitor for a car AC generator in which the solidified filling resin is an epoxy resin.

The above and other objects, features and advantages of the invention will become more apparent from the following description when taken in conjunction with the accompanying drawings.

DETAILED DESCRIPTION OF THE PREFERRED EMBODIMENTS

Embodiment 1

Figure 1:
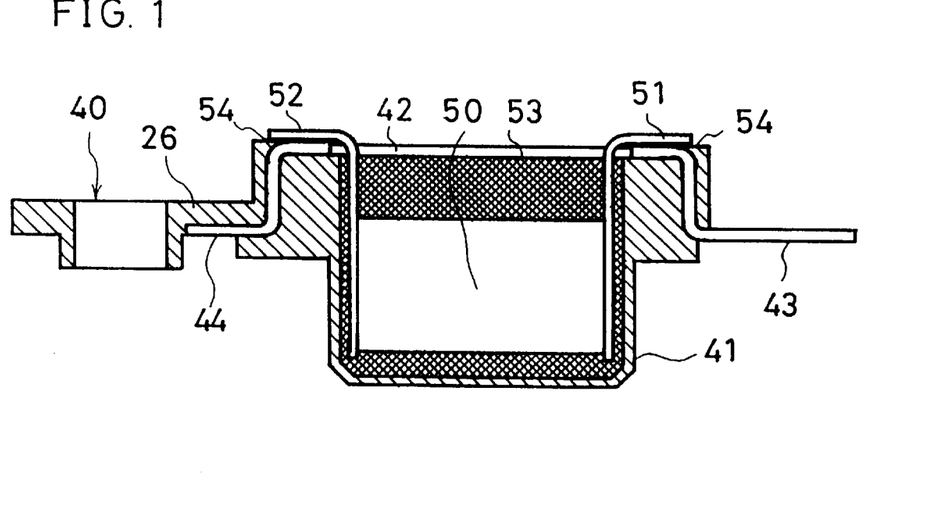
FIG. 1 is a sectional view cut on line A—A of FIG. 2.
Figure 2:
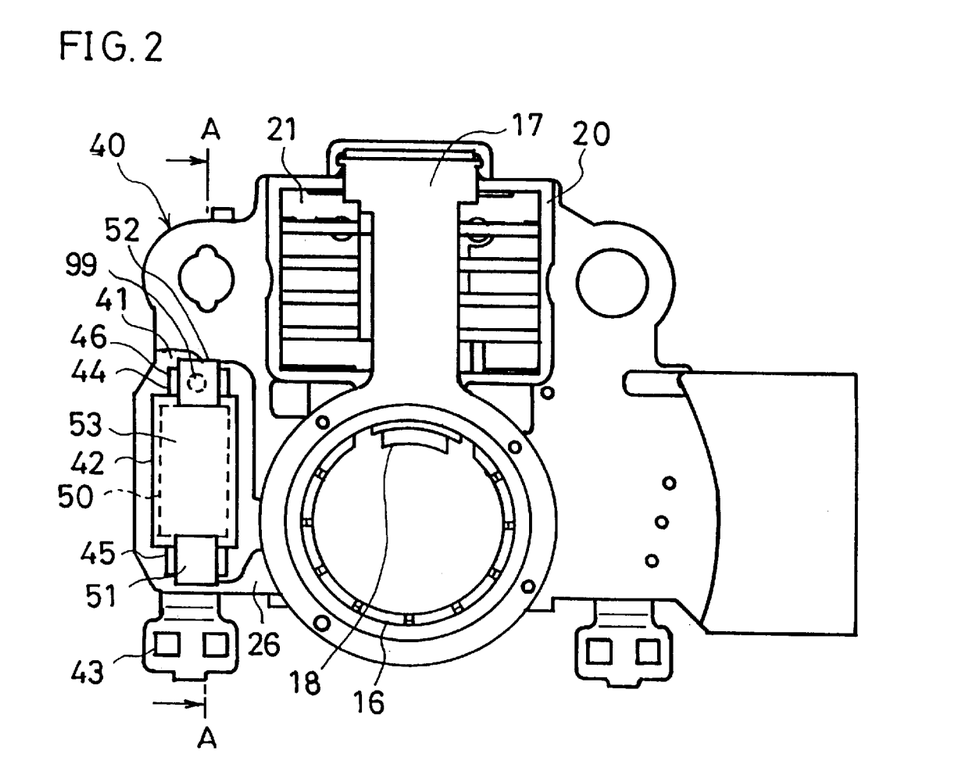
FIG. 2 is a front view of a capacitor according to Embodiment 1 of the present invention.

FIG. 1 and FIG. 2 show Embodiment 1 of the present invention. FIG. 1 is a sectional view cut on line A—A of FIG. 2, and FIG. 2 is a front view of a capacitor. In FIG. 2, reference numeral 40 denotes a first resin part corresponding to the first resin part 15 of the capacitor installed inside the above-described generator case 1, which is made from PPS (polyphenylene sulfide) resin and has a slinger portion 16 at a lower center location, a brush holder portion 17 above the slinger portion 16, a voltage control function portion 20 behind the brush holder portion 17, and a capacitor container portion 41 on one side of the slinger portion 16. Therefore, the first resin part 40 differs from the first resin part 15 in that the capacitor container portion 41 is provided. The capacitor container portion 41 is provided in a plate-like base portion 26 projecting sideways from the slinger portion 16 and the brush holder portion 17.

As shown in FIG. 1, the capacitor container portion 41 is shaped like a one-end open bottomed cylinder which is open to the front side of the base portion 26 and projects toward the rear of the base portion 26 from an opening portion 42. The inside space of the capacitor container portion 41 one end of which is open is formed larger than a capacitor element 50 corresponding to the above-described capacitor element 30. Two resin side terminals 43 and 44 are provided in the base portion 26 around the opening portion 42 in such a manner that they face each other. The resin side terminal 43 is used as a positive pole and the other resin side terminal 44 is used as a negative pole. A central bent portion of the resin side terminal 43 which is a positive pole is buried in the base portion 26 at the time of molding the first resin part 40. One end portion of the resin side terminal 43 extending horizontally from the bent portion on the rear side of the base portion 26 projects from the outer side wall of the base portion 26 and the other end portion extending horizontally from the bent portion in a direction opposite to that of the above end portion on the front side of the base portion 26 is laid in a recessed portion 45 formed in the front side of the base portion 26. A central bent portion of the resin side terminal 44 which is a negative pole is buried in the base portion 26 at the time of molding the first resin part 40. One end portion of the resin side terminal 44 extending horizontally from the bent portion on the rear side of the base portion 26 is laid in the rear side of the base portion 26 and the other end portion extending horizontally from the bent portion in a direction opposite to that of the above end portion on the front side of the base portion 26 is laid in a recessed portion 46 formed in the front side of the base portion 26.

The capacitor element 50 is shaped like a rod and has element side terminals 51 and 52 at both ends thereof. The element side terminals 51 and 52 extend in parallel in a direction perpendicular to the capacitor element 50 and end portions thereof are bent in opposite directions and extend up to the resin side terminals 43 and 44. The elements side terminal 51 is used as a positive pole and the other element side terminal 52 is used as a negative pole. The capacitor element 50 is inserted into the inside space of the capacitor container portion 41 from the opening portion 42 so that it is laid horizontally, and the element side terminals 51 and 52 are placed upon the resin side terminals 43 and 44 from an insertion direction, respectively. In this state, solder 54 is applied to contact surfaces between the resin side terminals 43 and 44 and the element side terminals 51 and 52 to connect the resin side terminals 43 and 44 to the respective element side terminals 51 and 52. A filling resin 53 which is a molten epoxy resin is charged into the gap between the capacitor container portion 41 and the capacitor element 50 from the opening portion 42 to such an extent that the capacitor element 50 and part of the element side terminals 51 and 52 are buried under the resin. By the solidification of the charged filling resin 53, the capacitor element 50 is supported in the capacitor container portion 41 by the filling resin 53. The work of connecting the resin side terminals 43 and 44 to the respective element side terminals 51 and 52 may be carried out before or after the work of charging the filling resin 53, but is preferably carried out before the work of charging the filling resin 53 from the view point of work efficiency.

According to the constitution of Embodiment 1, the direction of injecting the filling resin 53 into the capacitor container portion 41 and the direction of connecting the element side terminals 51 and 52 to the respective resin side terminals 43 and 43 by solder 54 are the same on the front side of the first resin part 40, thereby improving assembly work efficiency. Since the capacitor element 50 is supported in the capacitor container portion 41 integrated with the first resin part 40 by the filling resin 53, even when the car AC generator having this capacitor is connected to the engine of the automobile and vibration is transmitted from the engine to the car AC generator, the first resin part 40 bears the weight of the capacitor container portion 41, the weight of the capacitor element 50 and the weight of the filling resin 53, thereby making it possible to reduce a vibration load on the connection portions of the resin side terminals 43 and 44 and the element side terminals 51 and 52. Therefore, connection between the resin side terminals 43 and 44 and the element side terminals 51 and 52 can be maintained properly.

Embodiment 2

Figure 3:
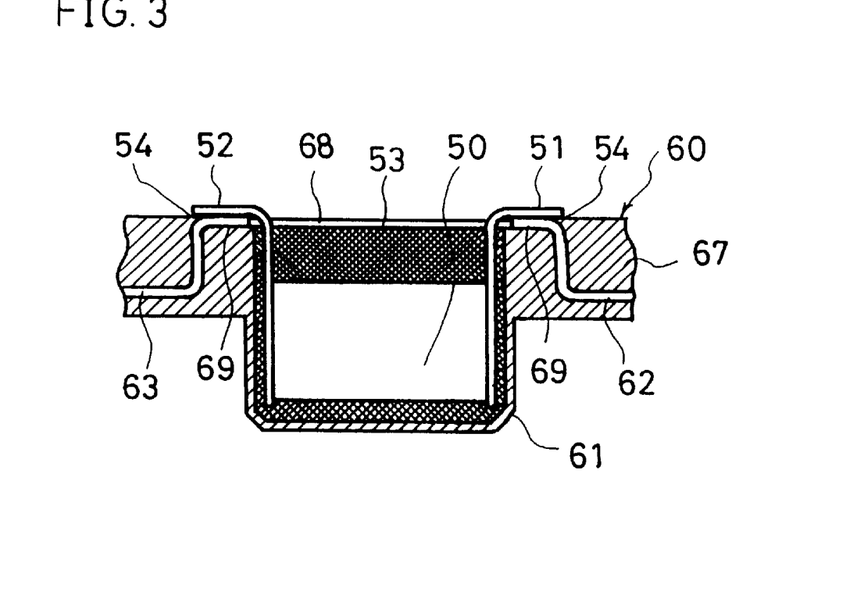
FIG. 3 is a sectional view cut on line B—B of FIG. 4.
Figure 4:
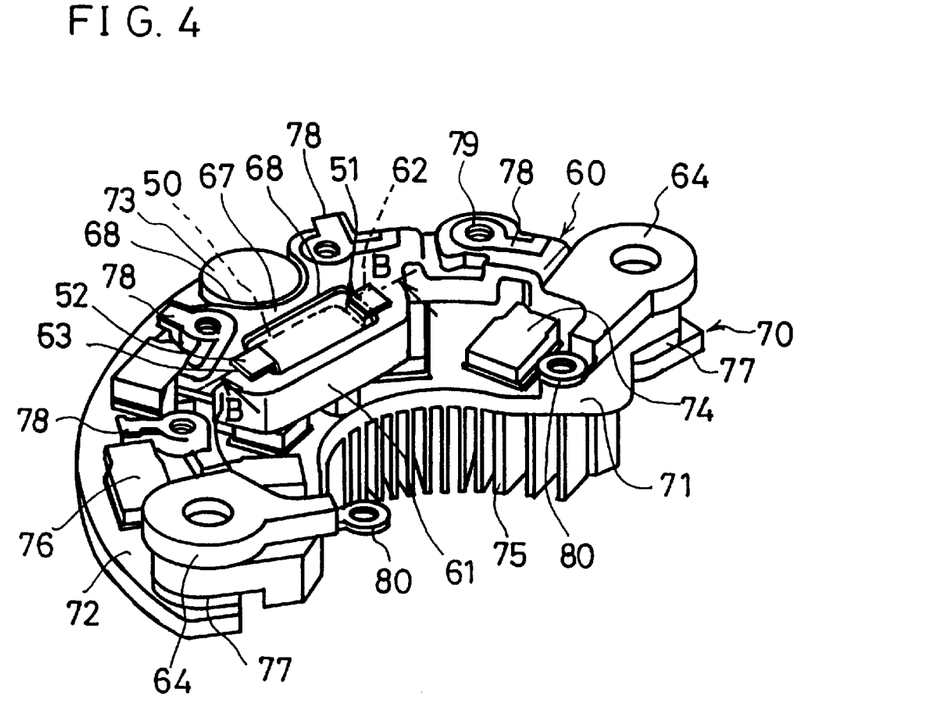
FIG. 4 is a perspective view of a capacitor according to Embodiment 2 of the present invention.

FIG. 3 and FIG. 4 show Embodiment 2 of the present invention. FIG. 3 is a sectional view cut on line B—B of FIG. 4 and FIG. 4 is a perspective view of the above capacitor. In FIG. 4, reference numeral 60 denotes a second resin part corresponding to the second resin part 22 installed inside the above-described generator case 1, which is made from PPS (polyphenylene sulfide) resin and molded as a semi-circular arc-shaped circuit board to be incorporated in a rectifying function part 70, having a capacitor container portion 61 corresponding to the above capacitor container portion 41 at the center, two resin side terminals 62 and 63 provided on both sides of the capacitor container portion 61 and an attachment portion 64 at both ends. Therefore, the second resin part 60 differs from the above second resin part 22 in that a one-end open bottomed cylinder-like capacitor container portion 61 is provided. This capacitor container portion 61 is arranged in a plate-like base portion 67 projecting into the semi-circular arc-shaped inside of the second resin part 60 from a center cut-away portion 66. The base portion 67 corresponds to the above base portion 26.

As shown in FIG. 3, the capacitor container portion 61 is the same as the capacitor container portion 41 of Embodiment 1. One of the two resin side terminals 62 and 63 provided in the base portion 67 around an opening portion 68 corresponding to the above opening portion 42 is used as a positive pole and the other is used as a negative pole like the resin side terminals 43 and 44 of Embodiment 1. However, a central bent portion and one end portion extending horizontally from the bent portion of each of the two resin side terminals 62 and 63 of this Embodiment 2 are buried in the base portion 67 at the time of molding the second resin part 60, and the other end portion extending horizontally in a direction opposite to that of the above end portion from the bent portion is laid in a recessed portion 69 formed in the front side of the base portion 67.

The capacitor element 50 is inserted into the inside space of the capacitor container portion 61 from the opening portion 68 so that it is laid horizontally, the element side terminals 51 and 52 are placed upon the respective resin side terminals 62 and 63 from an insertion direction, and solder 54 is applied to contact surfaces between the element side terminals 51 and 52 and the resin side terminals 62 and 63 to connect the element side terminals 51 and 52 to the respective resin side terminals 62 and 63. In this state, a filling resin 53 which is a molten epoxy resin is charged into the gap between the capacitor element 50 and the capacitor container portion 61 from the opening portion 68 until the capacitor element 50 and part of the element side terminals 62 and 63 are buried under the filling resin. By the solidification of the filling resin 53, the capacitor element 50 is supported in the capacitor container portion 61 by the filling resin 53.

Returning to FIG. 4, the rectifying function part 70 will be described. The rectifying function part 70 has the second resin part 60, a positive cooling plate 71 and a negative cooling plate 72 which are stacked on the rectifying function part in the order named. The positive cooling plate 71 is made from a highly conductive metal such as aluminum and shaped like a semi-circular arc smaller than the second resin part 60 and fixes four positive unidirectional conductive elements 74. A large number of cooling fins 75 project from the rear side of the positive cooling plate 71. The negative cooling plate 72 is made from a highly conductive metal such as aluminum and shaped like a semi-circular arc larger than the second resin part 60 and fixes an output terminal 73 at the center and two negative unidirectional conductive elements 76 on each of the both sides of the output terminal 73. An unshown cathode terminal of each of the unidirectional conductive elements 76 is connected to the negative cooling plate 72. In FIG. 4, the two unidirectional conductive elements 74 on the left side of the output terminal 73 are shown but the two unidirectional conductive elements 74 on the right side of the output terminal 73 of the negative cooling plate 72 are not shown. The unidirectional conductive elements 74 and 76 of the positive cooling plate 71 and the negative cooling plate 72 are electric parts such as diodes for rectifying a three-phase alternating current from the coil of the stator 5 (see FIG. 9).

A molded insulator 77 is each inserted between both end portions of the positive cooling plate 71 and both end portions of the negative cooling plate 72 so that the positive cooling plate 71, the negative cooling plate 72 and the second resin part 60 are stacked one upon another. In this state, the second resin part 60 and the rectifying function part 70 consisting of the positive cooling plate 71 and the negative cooling plate 72 are fastened to the rear bracket 3 (see FIG. 9) by unshown bolts extending through the both end portions of the negative cooling plate 72 from the attachment portion 64 at both ends of the second resin part 60 through the both end portions of the positive cooling plate 71. Unshown anode terminals of the positive unidirectional conductive elements 74 are connected to the respective connection terminals 78 provided on the second resin part 60. A crimp-style terminal provided on an unshown wire extended from the coil of the stator 5 is fastened to a threaded hole 79 formed in each of the connection terminals 78 by a stopping screw. Each of connection terminals 80 projecting from the attachment portion 64 of the second resin part 60 is connected to the voltage regulator 21 (see FIG. 9).

According to the constitution of Embodiment 2, assembly work efficiency is high and a vibration load on the connection portions of the element side terminals and the resin side terminals can be reduced as in Embodiment 1.

Embodiment 3

Figure 5:
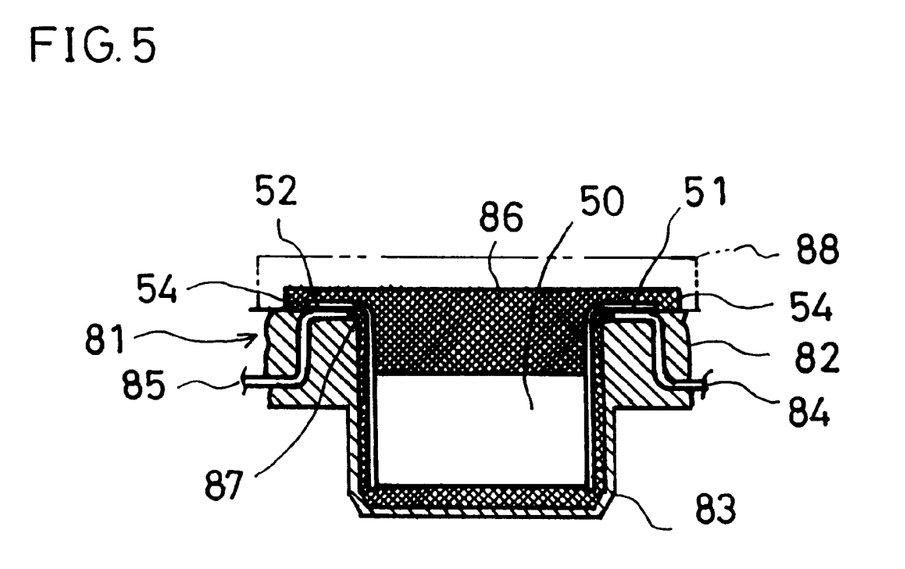
FIG. 5 is a sectional view cut on line C—C of FIG. 6.
Figure 6:
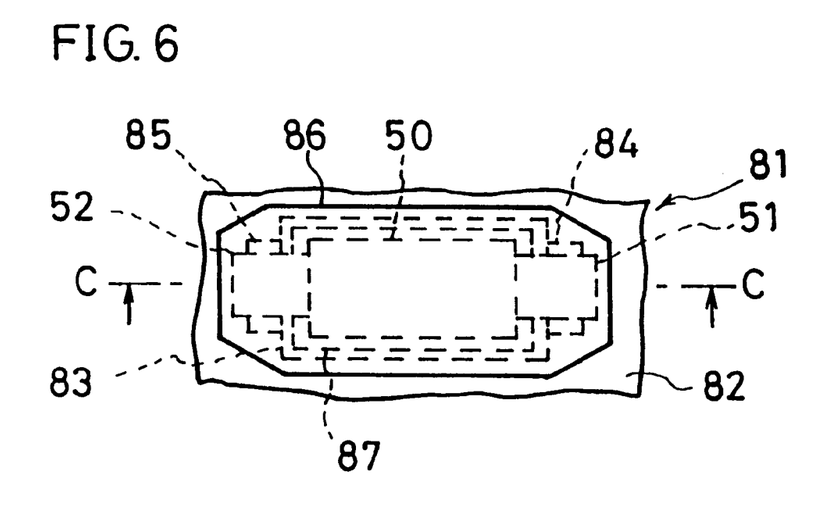
FIG. 6 is a partial front view of a capacitor according to Embodiment 3 of the present invention.

FIG. 5 and FIG. 6 show Embodiment 3 of the present invention. FIG. 5 is a sectional view cut on line C—C of FIG. 6 and FIG. 6 is a partial front view of a capacitor. In FIG. 6, reference numeral 81 denotes a resin part made from PPS resin and corresponding to the above first resin part 40 and the above second resin part 60. A one-end open bottomed cylinder-like capacitor container portion 83, a positive resin side terminal 84 and a negative resin side terminal 85 are integrated with the base portion 82 of the resin part 81 by the molding of the resin part 81. The resin side terminals 84 and 85 correspond to any ones of the above resin side terminals 43, 44, 62 and 63.

As shown in FIG. 5, a filling resin 86 which is an epoxy resin covers a capacitor element 50, element side terminals 51 and 52, and resin side terminals 84 and 85 while it projects beyond the connection portions of the resin side terminals 84 and 85 and the element side terminals 51 and 52 of the capacitor element 50 from the front surface of the base portion 82 and is solidified. Therefore, this Embodiment 3 differs from Embodiments 1 and 2 in that the capacitor element 50, the element side terminals 51 and 52, and the resin side terminals 84 and 85 are covered by the filling resin 86. That is, the capacitor element 50 is inserted into the inside space of the capacitor container portion 83 from the opening portion 87 so that it is laid horizontally, the element side terminals 51 and 52 are connected to the respective resin side terminals 84 and 85 by solder 54, and a cylindrical frame 88 shown by a virtual line and surrounding the opening portion 87 of the capacitor container portion 83 and the resin side terminals 84 and 85 is arranged on the front surface of the base portion 82. The molten filling resin 86 is charged into the gap between the capacitor element 50 and the capacitor container portion 83 from the inside of the frame 88 through the opening 87 until the capacitor element 50, the element side terminals 51 and 52, and the resin side terminals 84 and 85 are buried under the filling resin 86. After the solidification of the filling resin 86, the frame 88 is removed. Thereby, the filling resin 86 covers the capacitor element 50, the element side terminals 51 and 52, and the resin side terminals 84 and 85 so that the capacitor element 50 is supported in the capacitor container portion 83 by the filling resin 86. In Embodiment 3, the work of connecting the element side terminals 51 and 52 to the respective resin side terminals 84 and 85 is carried out before the work of charging the filling resin as a matter of course.

According to the constitution of Embodiment 3, since the filling resin 86 covers the element side terminals 51 and 52 and the resin side terminals 84 and 85, the element side terminals 51 and 52 and the resin side terminals 84 and 85 are sealed up by the filling resin 86 and the resin part 81, thereby preventing water from entering the connection portions of the element side terminals 51 and 52 and the resin side terminals 84 and 85. Consequently, the electrolytic corrosion and rusting of the element side terminals 51 and 52 and the resin side terminals 84 and 85 can be prevented.

Embodiment 4

Figure 7:
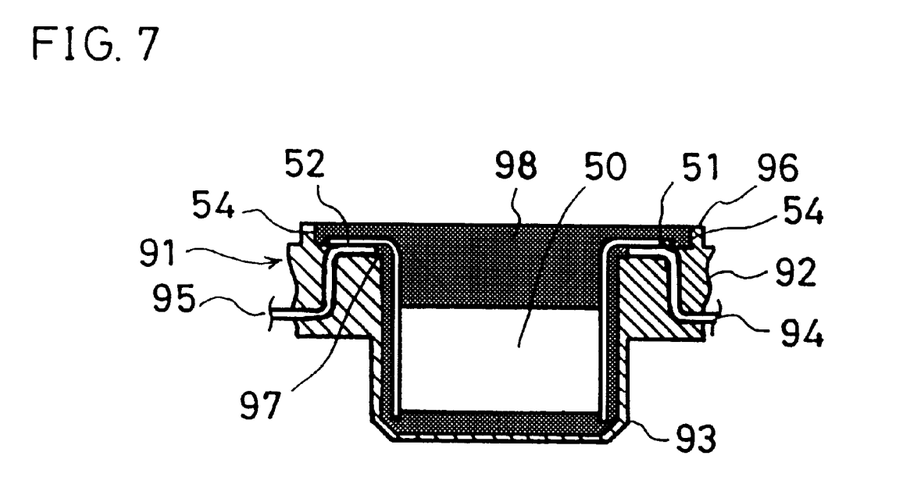
FIG. 7 is a sectional view cut on line D—D of FIG. 8.
Figure 8:
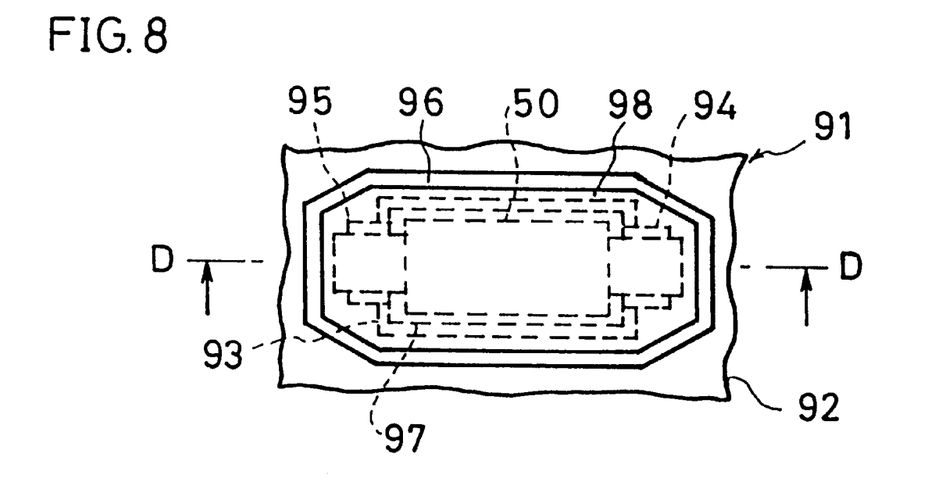
FIG. 8 is a partial front view of a capacitor according to Embodiment 4 of the present invention.

FIG. 7 and FIG. 8 show Embodiment 4 of the present invention. FIG. 7 is a sectional view cut on line D—D of FIG. 8 and FIG. 8 is a partial front view of a capacitor. In FIG. 8, reference numeral 91 denotes a resin part corresponding to the above resin part 81. A one-end open bottomed cylinder-like capacitor container portion 93, a positive resin side terminal 94, a negative resin side terminal 95 and a barrier 96 are integrated with the base portion 92 of the resin part 91 by the molding of the resin part 91. The barrier 96 corresponds to the above frame 88 and is ring-shaped to surround the opening 97 of the capacitor container portion 93 and the resin side terminals 94 and 95. Therefore, the resin part 91 differs from the above resin part 81 in that the barrier 96 is provided.

As shown in FIG. 7, the barrier 96 projects beyond the connection portions of the resin side terminals 94 and 95 and the element side terminals 51 and 52 of the capacitor element 50 from the front surface of the base portion 92. The capacitor element 50 is inserted into the inside space of the capacitor container portion 93 from the opening portion 97 so that it is laid horizontally, the element side terminals 51 and 52 are connected to the respective resin side terminals 94 and 95 by solder 54, and a molten filling resin 98 is charged into the gap between the capacitor element 50 and the capacitor container portion 93 from the inside of the barrier 96 through the opening portion 97 until the capacitor element 50, the element side terminals 51 and 52, and the resin side terminals 94 and 95 are buried under the filling resin 98. The filling resin 86 is solidified to cover the capacitor element 50, the element side terminals 51 and 52, and the resin side terminals 94 and 95 so that the capacitor element 50 is supported in the capacitor container portion 93 by the filling resin 98. Also in Embodiment 4, the work of connecting the element side terminals 51 and 52 to the respective resin side terminals 84 and 85 is carried out before the work of charging the filling resin as a matter of course.

According to the constitution of Embodiment 4, since the resin part 91 has the barrier 96, the filling resin 86 can cover the element side terminals 51 and 52 and the resin side terminals 84 and 85 without using a frame, thereby further improving assembly work efficiency.

The car AC generator may or may not have a brush.

In Embodiment 1 and Embodiment 2, the filling resin 53 covers the whole capacitor element 50. If the filling resin 53 supports the capacitor element 50 in the capacitor container portion 41 or 61, part of the capacitor element 50 may project from the filling resin 53.

In the above Embodiments, the resin side terminals 43 and 44, 62 and 63, 84 and 85, or 94 and 95 are connected to the respective element side terminals 51 and 52 by solder 54. When they are connected by welding 99 shown by a virtual line in FIG. 2, connection strength is further improved.

As described above, according to the first aspect of the present invention, since the direction of injecting the filling resin into the container portion and the direction of connecting the element side terminals to the respective resin side terminals are the same with respect to the resin part, assembly work efficiency can be improved. Since the capacitor element is supported in the container portion integrated with the resin part by the filling resin, the resin part bears the weight of the container portion, the weight of the capacitor element and the weight of the filling resin, thereby making it possible to reduce a vibration load on the connection portions of the element side terminals and the resin side terminals.

According to the second aspect of the present invention, since the capacitor element, the element side terminals and the resin side terminals are buried under the solidified resin, electrolytic corrosion or rusting can be prevented.

According to the third aspect of the present invention, since the resin part has a barrier surrounding the opening portion of the container portion and the resin side terminals, resin leak which occurs at the time of charging the resin for supporting the capacitor element in the container portion is prevented, thereby improving work efficiency.

According to the fourth aspect of the present invention, since the resin side terminals are connected to the respective element side terminals by welding, connection strength is further improved.

According to the fifth aspect of the present invention, since the resin for supporting the capacitor element in the container portion is an epoxy resin, heat resistance and support strength are excellent.

What is claimed is:

1. A capacitor for a car AC generator comprising:

a generator case having an inside space:

a resin part installed in the inside space of the generator case and having integrally formed therein a one-end open bottomed cylindrically-shaped container portion and resin side terminals around an opening portion of the container portion, a capacitor element for absorbing a surge generated by the voltage control of a voltage regulator, said element being inserted into the inside of the container portion, element side terminals of the capacitor element being connected to the respective resin side terminals on an insertion side, and a solidified resin, the capacitor element being supported in the container portion by said solidified resin which is charged into a gap between the container portion and the capacitor element.

2. The capacitor for a car AC generator according to claim 1, wherein the capacitor element, the element side terminals and the resin side terminals are covered by a solidified filling resin.

3. The capacitor for a car AC generator according to claim 1, wherein the resin part has a barrier surrounding the opening portion of the container portion and the resin side terminals.

4. The capacitor for a car AC generator according to claim 1, wherein the resin side terminals are connected to the respective element side terminals by welding.

5. The capacitor for a car AC generator according to claim 1, wherein the solidified resin is an epoxy resin.

* * * * *